United States Patent [19]

Barnett et al.

[11] 4,341,832
[45] Jul. 27, 1982

[54] SYNTHETIC CHAMOIS WIPING CLOTHS

[75] Inventors: Gary A. Barnett, Lyman; James P. Shealy, Jr., Rock Hill, both of S.C.

[73] Assignee: M. Lowenstein Corporation, New York, N.Y.

[21] Appl. No.: 268,258

[22] Filed: May 29, 1981

[51] Int. Cl.³ .............................................. B32B 3/00
[52] U.S. Cl. ................................. 428/196; 427/210; 427/244; 427/261; 428/85; 428/86; 428/95; 428/195; 428/197; 428/246; 428/248; 428/266; 428/284; 428/308.4; 428/309.9; 428/311.5; 428/317.9; 428/332; 428/339; 428/423.1; 428/904
[58] Field of Search ............... 428/195, 196, 197, 198, 428/246, 248, 85, 904, 339, 325, 92, 95, 87, 306.6, 308.4, 266, 309.9, 311.1, 311.5, 311.7, 317.9, 91, 86, 423.1, 284, 332; 427/210, 244, 261

[56] References Cited

U.S. PATENT DOCUMENTS

| 3,256,131 | 6/1966 | Koch et al. | 428/196 |
| 3,310,422 | 3/1967 | Petry | 427/261 |
| 3,713,868 | 1/1973 | Gordon et al. | 427/244 |
| 3,804,700 | 4/1974 | Hoey | 428/196 |
| 3,865,622 | 2/1975 | Blair | 428/290 |
| 3,906,131 | 9/1975 | Böe | 428/151 |
| 4,017,656 | 4/1977 | Lasman et al. | 428/95 |

Primary Examiner—James J. Bell
Attorney, Agent, or Firm—Luke J. Wilburn, Jr.; Wellington M. Manning, Jr.

[57] ABSTRACT

An improved composite sheet material product having the appearance, drape, hand and water absorption and retention characteristics of natural chamois leather, comprising, in combination, a reinforcing textile fabric having opposed raised fiber faces, a soft water-absorbent porous polymeric foam layer secured to the opposed raised fibrous faces of the textile fabric, the foam layers having a normal high surface tack characteristic causing sticking and delamination of the layers from the sheet material under pressure contact, and wherein the exposed porous surfaces of the normally tacky foam layers are coated with a non-tacky water insoluble, film-forming polymer, such as a urethane polymer, to minimize tackification and delamination of the foam layers without noticeable loss in water absorption, retention, and appearance of the composite sheet material to that of natural chamois leather.

Also disclosed is a method of manufacture of such composite sheet material products.

21 Claims, 2 Drawing Figures

SYNTHETIC CHAMOIS WIPING CLOTHS

The present invention is directed to production of synthetic leather products, and, more particularly, to improved composite sheet material products having appearance, drape, hand, and water absorption and retention characteristics of natural chamois leather, and to a method of manufacture of such products.

BACKGROUND OF THE INVENTION

Due to the limited availability and expense of natural leathers, numerous composite sheet materials have been developed to simulate the appearance and physical properties of natural leathers. Such synthetic leather products find wide commercial use as a substitute for natural leathers in manufacture of various products, such as garments, shoes, pocketbooks, and other wearing apparel and accessories.

U.S. Pat. No. 4,017,656 discloses an imitation leather material stated to be for use as shoe uppers which comprises a woven fabric having a napped face impregnated with a nitrile-butadiene resin to provide a flesh leather-like surface, and an unnapped face coated with a foamed polymer layer or layers, the outer surface of which is coated with a thin urethane resin layer which may be embossed to provide a leather appearance thereto.

U.S. Pat. No. 3,865,622 discloses a water-proof and oil-proof synthetic leather product for use in wearing apparel wherein a fabric such as a cotton woven fabric, is coated with a butadiene-acrylonitrile composition containing suitable pigments, clay thickening agents, and a curing agent.

U.S. Pat. No. 3,906,131 discloses a synthetic chamois leather like material comprising a non-woven textile fabric treated with a binder and coated on opposed faces with a coagulatable butadiene-acrylonitrile latex which may be mechanically foamed and applied to the non-woven fabric to form a porous layer.

B. F. Goodrich Chemical Co. Customer Service Report entitled "Chamois-Like Hycar Acrylate and Nitrile Latex Stand-Up Foams" dated Nov. 7, 1977 by Peter D. Seletzky discloses development work utilizing several acrylate and nitrile latex foam compositions to coat napped cotton and nylon fabrics to produce simulated chamois fabrics for use in manufacture of garments.

Of the many natural leather products, natural chamois leather has long been recognized as an excellent wiping cloth for cleaning, polishing and drying various surfaces, such as automobile bodies, and the like. Because of the soft, pliant, porous nature of the leather, natural chamois has a high rate of water absorption and a high level of water retention. When wet out, natural chamois is non-abrasive to surfaces on which it is used. From a standpoint of commercial acceptance and saleability, it is therefore desirable that any so-called synthetic leather wiping cloth products closely resemble the appearance, feel, and drape of natural chamois leather which the public has come to recognize as a standard of quality. From a performance standpoint, it is also desirable that such wiping cloth products have a fast rate of liquid absorption, typically of about five seconds or less (as measured by AATCC Test Method 79-1972), and an ability to retain absorbed liquid in an amount which is at least about 300 percent of the dry weight of the wiping cloth product. Although a number of so-called synthetic chamois wiping cloth products presently in the marketplace provide acceptable water retention for surface wiping operations, most are either rather stiff and broadly, have relatively low water absorption rates, or do not possess the appearance of natural chamois leather.

In this regard, it has been found that certain soft acrylonitrile polymers having relatively low glass transition temperatures, when applied as foam layers to opposed napped faces of a reinforcing textile fabric, provide excellent water-absorptive composite materials which very closely resemble the surface appearance, softness and drape of natural chamois leather. However, the attempted use of such soft polymers in the commercial manufacture of synthetic chamois leather wiping cloths presents many problems because of the inherent high surface "tack" which such polymeric foam layers exhibit. This high surface tack characteristic causes the outer foam surfaces of the composite sheet to stick together when brought into pressure contact during manufacture and storage, and also when the surfaces are brought into pressure contact during use. Such a characteristic, known as surface blocking, causes delamination of the foam layers from the reinforcing fabric, and therefore does not result in a commercially feasible product. Attempts to reduce surface tack by chemical modification of the polymeric foam compositions, as by cross-linking the polymeric components to a greater extent, generally lowers the surface tack, but correspondingly detracts from the desired soft drapeable natural chamois appearance, and also significantly reduces the liquid absorption and retention capabilities of the product.

BRIEF OBJECTS OF THE INVENTION

It is therefore an object of the present invention to provide an improved artificial chamois sheet material having high liquid absorbency and retention particularly suited for use in surface cleaning operations.

It is a more specific object to provide synthetic leather composite sheet material having the appearance and feel of natural chamois, excellent water absorption and retention, and without noticeable surface tack.

SUMMARY OF THE INVENTION

Briefly, the present invention is a composite sheet material product having the physical characteristics and appearance of natural chamois leather and comprises a dimensionally stable reinforcing fabric having opposed raised fiber faces which are coated with a soft, highly water-absorbent polymeric porous foam layer. The exposed normally tacky outer surfaces of the porous foam layers are discontinuously overcoated, as by printing, with a non-tacky, water-insoluble, film-forming polymer composition to provide a discontinuous thin coating of generally uniformly dispersed small spots of the film-forming polymer on the porous foam layer surfaces.

Preferably the film-forming polymer is a solvent-based urethane resin and is applied to discontinuous, discrete, closely spaced areas of the foam surfaces. By controlling the viscosity and amount of polyurethane composition applied to ensure that a discontinuous coating is obtained on the surface, tack and blocking of the foam layer surfaces is eliminated, and surprisingly without any significant loss in water absorption or retention of the product, or any noticeable change in its soft chamois-like surface appearance, drape and feel or hand.

BRIEF DESCRIPTION OF THE DRAWINGS

The present invention will be better understood, and the above as well as other objects thereof will become more apparent, from the following detailed description of preferred embodiments of the invention, when taken in conjunction with the accompanying drawings, in which.

DETAILED DESCRIPTION OF PREFERRED EMBODIMENTS

Figure 1:
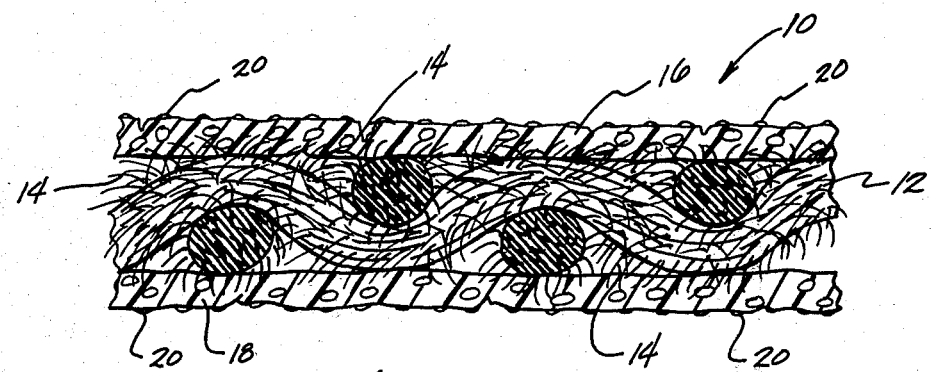
FIG. 1 is an exaggerated and magnified depiction, in cross sectional view, of an artificial chamois wiping cloth product of the present invention, illustrating schematically the relative positions of the composite reinforcing fabric, foam layers, and discontinuous top coat of the product.
Figure 2:
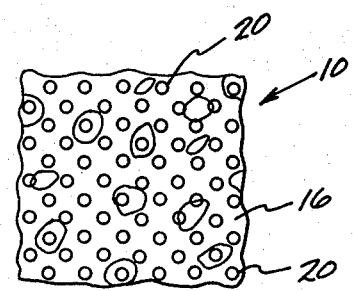
FIG. 2 is a depictive magnified plan view of a portion of the product of FIG. 1, showing the discontinuous generally uniform distribution of the top coat of the product.

As illustrated in FIG. 1, the synthetic chamois sheet material 10 of the present invention, as seen in depictive cross-section, includes a centrally disposed reinforcing fabric, shown as a woven fabric 12, the surface fibers 14 of which have been raised to a desired degree, as in a textile napping operation. Secured to the upper and lower napped surfaces of the fabric 12 are layers 16, 18 of an open cell, porous polymeric foam into which the napped surface fibers 14 of the fabric are at least partially embedded. As seen in FIGS. 1 and 2, located on the outer exposed porous surfaces of foam layers 16, 18 are a plurality of thin generally uniformly and closely spaced small discrete spots 20 of a non-tacky, water-insoluble, polymeric film-forming resin which forms a discontinuous top coat on the foam layer surfaces.

The reinforcing fabric of the present invention comprises a textile fabric construction having good dimensional stability and capable of being napped or brushed to provide upstanding fibers on the opposed faces of the same. The raised fibers, which at least are partially embedded in the polymeric foam layers during the coating operation, not only improve bonding and adhesion of the foam layers to the reinforcing fabric, but also impart a desired surface appearance to the foam layers which closely simulates the somewhat uneven surface appearance of a natural chamois leather. Although napped woven fabrics are preferred, it is contemplated that napped or brushed knit and nonwoven fabric structures may be employed, provided they have sufficient dimensional stability to prevent delamination or cracking of the foam layers during use of the product. Preferably, the reinforcing fabric contains hydrophilic spun yarns to aid in absorption and retention of liquid in the product. Cotton yarns, rayon yarns, or blends thereof with synthetic fibers, such as polyester and nylon, may be well suited for this purpose.

As the porous water-absorbent foam layers of the composite product, soft acrylonitrile resins, particularly butadiene-acrylonitrile copolymers having a low glass-transition temperature, have been found to be excellent in simulating the hand, drape, and surface appearance of natural chamois leather, while providing high rate of liquid absorption and retention in the product. Best results have been obtained in the use of Hycar 1572X45 Latex manufactured by B. F. Goodrich. Hycar 1572X45 is a reactive medium acrylonitrile content latex containing a colloidal suspension of individual spherical particles of a butadiene-acrylonitrile copolymer in water, with a solids content of about 46–48 percent, and a glass transition temperature of $-30°$ C.

In addition to the acrylonitrile polymer, the foam composition preferably includes a hydrophilic inert filler, such as clay. Although the amount of filler in the composition may be varied, excellent results have been obtained in the use of about two parts of solids filler to five parts of solids polymer resin, by weight. The foam composition may also include conventional foam stabilizers, thickeners, cross-linking agents, catalysts, and pigments to impart the desired color to the product.

To provide chamois-like appearance and water absorption, the foam layers are mechanically foamed to a foam ratio, i.e., volume of air to volume of coating composition, of between about 2 to 1 to 6 to 1, and preferably to a foam ratio of about 4 to 1. The thickness of the foam layers may be varied, depending upon the desired characteristics of the final product, but typically each layer may be from about 10 to 15 mils in thickness.

As the polymeric film-forming composition employed to discontinuously overcoat the foam layers, non-tacky, water-insoluble, film-forming polymeric resins which have a 100% modulus of between about 200 to 5000 psi, a tensile strength of between about 2,000 to 12,000 psi, and an elongation at break of between about 110 to 800%, (all as measured by ASTM Test Method D-638-77a), are believed to perform acceptably in eliminating surface blocking of the soft polymeric foam layers of the composite product. In particular, water-insoluble urethane polymers have been found to be excellent in unblocking of the foam layer surfaces without detracting from the desired physical characteristics of the product.

The overcoat composition preferably may contain in addition to the water-insoluble film-forming polymer, small amounts of antiblocking or slip agents, such as silicones, colloidal silica, or waxes to facilitate non-blocking of the foam layer surfaces. Typically, such additives may be present in a range of from about 0.3% to 5% by weight of the film-forming polymer.

Although the overcoat polymers might be applied to the foam layers in aqueous emulsion form, excellent results have been obtained by use of solvent-based solutions of the polymers, with application being accomplished by gravure roll printing. Of the urethane polymers, a solvent-based aliphatic urethane polymer composition, Permuthane U-10-046 (Permuthane Chem. Div. of Beatrice Foods) has been found by us to provide best results in eliminating surface tack of the foam layers without significant loss of the liquid absorption and retention or chamois-like appearance of the composite sheet material product. Permuthane U-10-046 contains 16% total solids and 0.3% silicone by weight based on the weight of the urethane polymer.

The amount of overcoat polymer applied to the foam layer surfaces, and the amount of surface coverage of the layers by the overcoat polymer may be varied to some degree, depending upon the specific physical performance desired in the final composite product. Based on experience, utilizing a rotagravure roll printer of uniformly distributed quadrangular cell surface construction, it has been found that from about 0.05 to 0.25 oz. (dry wgt.) of the overcoat polymer may be applied per sq. yd. of foam surface area to obtain acceptable detackification without appreciable loss of water absorption and retention, giving an estimated corresponding surface coverage (estimated by magnified visual observation) of the foam layer surfaces of between about 25% to 75%. With the aforementioned solvent-based urethane, Permuthane U-10-046, best results have been achieved with an average weight add on of the urethane polymer of about 0.14 oz. per sq. yd. (applied from a 110 line quadrangular cell gravure roll sold by Consolidated Engravers Corp. of Charlotte, N.C.) and with an estimated magnified visual surface coverage of about 50 percent of the foam layer surfaces. Preferably, the overcoat polymer is applied to closely spaced small discrete areas of the surface of the foam layers, while leaving intermediate surface areas of the foam uncoated and exposed for passage of liquid into the interstices of the foam and composite sheet material product.

The viscosity of the overcoat composition may be varied, depending upon the particular surface porosity and characteristics of the foam layers to be discontinuously overcoated and the particular equipment employed in the overcoating operation. Viscosity ranges of between about 150 to 300 centipoise (Brookfield RVT viscometer #3 spindle, 20 rpm) have been found acceptable in applying the discontinuous overcoat in a gravure roll printing operation.

The products of the present invention may be produced on conventional textile coating and printing range equipment. Prior to coating and printing, both faces of a length of woven fabric are subjected to a surface fiber-raising operation, as by several passes of the fabric through a napping machine. The napped fabric is thereafter passed through a textile fabric coating range, such as a knife-over-roll coater to apply the mechanically foamed polymeric composition to a first face of the same. The coated fabric thereafter is passed through one or more heating ovens to dry and cure the foam, and the fabric is suitably collected.

Thereafter the single face-coated fabric is passed through a printing range where the foam-coated surface of the fabric is over-printed with the water-insoluble, non-tacky film forming polymer to form a discontinuous coating on the foam layer surface. Preferably, the overcoat polymer is applied to the foam surface by a gravure printing roll. The overprinted fabric is then dried, collected in roll form, and again passed through the coating and printing ranges described above to foam coat, cure, overprint, and dry the other napped face of the fabric.

The improvements of the present invention will become more apparent from the following specific examples comparing products of the present invention to a foam-coated synthetic chamois product which is not overprinted with a film-forming polymer.

EXAMPLE I

A polymeric foam latex composition was prepared by combining the ingredients of Table I in the order listed in a Cowl mixer, with continuous stirring of the mixture as the parts were added.

TABLE I

| COMPONENT | PARTS BY WEIGHT |
|---|---|
| Hycar 1572 × 45, Butadiene Acrylonitrile copolymer latex; B. F. Goodrich (47.4% Solids) | 150 |
| Catalpo Clay, Pigment Extender; Freeport Kaolin Company (60% Solids) | 55 |
| R-900, Titanium Dioxide Pigment, N.L. Industries (60% Solids) | 5 |
| Ammonium Stearate foam stabilizer; Diamond Shamrock Company (33% Solids) | 7.5 |
| M-3, Melamine Formaldehyde cross-linking Resin, American Cyanamid (98% Active) | 9 |
| Paragum 131, Polacrylamide Thickner, Para-Chem, Inc. (50% Solids) | 5 |
| Catalyst DA, Resin Catalyst for Crosslinking, Ammonium salt Organic Acid; Astro Industries (65% Active) | 0.875 |
| Color Concentrate blend of Organic and Inorganic Pigments | 3.375 |

The resultant composition, which had a viscosity of 3000–3200 cps. (#6 Spindle @ 20 RPM, Brookfield), was then foamed to a foam ratio of 4 to 1, air to composition, in an Oakes mechanical foamer.

A length of woven fabric composed of 75/25% polyester/cotton warp yarns having 20 singles cotton count, and 100% cotton fill yarns having a 8.5 singles cotton count, and having a 48×42 warp/fill yarn ends per inch construction, and a fabric weight of 5.85 oz. per sq. yd. was subjected to a textile napping operation by multiple passes through a conventional Woonsocket napper to raise the fibers to a length of a minimum of approximately 4 mils on each face of the fabric, as measured with an Ames Mo. 462 gauge. The napped fabric was then passed through a knife-over-roll coater, at a speed of approximately 8 yds. per min., to apply the foamed latex composition of Table I to a first napped face of the fabric in a layer approximately 10 mils thickness. The face-coated fabric was dried by passage through a drying oven at a temperature of approximately 435° F., and thereafter cured in a curing oven at a temperature of approximately 400° F. for approximately 90 seconds.

The single face-coated fabric was again passed through the knife-over-roll coater and heating ovens, under the conditions as described, to apply and cure a 10 mil foam layer on the other napped face of the textile fabric. The face-coated fabric product, which had a polymeric foam add-on of approximately 1.0 to 1.25 oz. per sq. yd. on each face of the fabric, exhibited the drape, hand, and physical appearance of natural chamois leather but possessed high surface tackiness. Two sample areas of the composite product, which serve as a control for comparison, were tested for water absorption, retention and surface tack by the following test procedures. The results of these tests are listed in Table II, hereinafter.

Liquid Absorption Speed Test (AATC Test Method 79-1972)

A sample of the composite product is air dried and brought to a moisture equilibrium in a standard atmosphere having a relative humidity of approximately 65% at approximately 70° F. The sample is mounted in an embroidery hoop so that the surface of the sample is held taut. The mounted sample is then held about 1 centimeter below the tip of a burette containing tap water at room temperature, and the burette adjusted to deliver one drop of water onto the surface of the sample approximately every 5 seconds. The sample is located between an observer and a source of light, such as a window, and at an angle such that the specular reflectance of light from the surface of the water drop on the sample surface can be plainly seen. As each drop of water is gradually absorbed into the sample surface, the specular reflectance of light from the top diminishes and finally vanishes entirely, leaving only a dull wet spot. A stop watch is employed to measure the time lapse between the first application of the drop on the surface and the absence of specular reflection of the same as it is absorbed into the surface. Liquid drop absorption times at three different surface locations on the sample are recorded and the average thereof taken as the liquid absorption speed of the sample.

Total Liquid Absorption Test

A dry 6"×6" composite product sample is weighed, and the weight of the sample recorded. The sample is then completely wet out by immersion in tap water to pick up as much water as possible. After wetting out, the sample is removed from the water and the water is allowed to drip off the sample until it stops. The wet sample is then weighed and the weight of the wet sample recorded. The difference in the dry and wet weight of the sample is obtained, the result divided by the dry weight of the sample, and that figure multiplied by 100 to obtain total liquid absorption, expressed in percent, based on the dry weight of the sample.

Surface Tack Test

Ten 8"×8" composite product samples are each folded in half upon themselves twice to form a 4"×4" square. Each sample is placed between two glass plates and a 4 lb. weight is applied to the top plate. The weighted samples are preheated in an oven for 30 minutes at a temperature of 80° C., removed, and allowed to cool for 5 minutes. Each folded sample is unfolded by pulling the opposed folded faces apart manually, and rated visually in accordance with the following numerical rating scale:

1. Surfaces stick together and foam delaminates from the product upon pulling surfaces apart.
2. Surfaces stick together and slight pick off of foam occurs upon pulling apart.
3. Surfaces stick together, but pull apart with no foam pick off.
4. Surfaces are slightly tacky but no sticking upon pulling apart.
5. No surface tack is observed and surfaces do not stick together upon unfolding of the sample.

EXAMPLE II

Opposed faces of an additional length of the uncoated napped fabric construction of Example I were foam coated, as described in Example I, except that after each fabric face was foamed coated and cured, the surface of the cured foam layer was overprinted with a solvent-based aliphatic urethane polymer composition, Permuthane U-10-046, to apply a thin discontinuous coating of the urethane polymer to discontinuous, small, closely spaced surface areas of the porous foam layers. Viscosity of the solvent-based urethane polymer composition was approximately 180 centipoise, and application of the urethane polymer was accomplished by gravure roll printing equipment, using a Consolidated Engravers Corp. gravure printing roll having a surface construction of 110 quadrangular cells per inch, with a theoretical cell volume of about 20 cubic billion microns per square inch. After drying, the dry weight pick-up of urethane polymer on each foam layer surface was about 0.14 oz. per sq. yd. of surface area.

The resultant composite sheet material product exhibited the same soft hand, drape, and physical appearance of natural chamois leather, as in Example I, with no appearance of the discontinuous urethane coating on the porous exposed surfaces of the foam layers to the naked eye.

Two sample areas of the resultant coated and overprinted composite sheet product were then tested for liquid absorption, retention, and surface tack by the above identified test procedures; and the results are presented in Table II.

EXAMPLE III

Napped woven fabric constructions as in Example I were foam coated and overprinted with the acrylonitrile and urethane compositions under conditions described in Example II, except that foam coating compositions applied to the napped faces of the fabrics were mechanically foamed to varying ratios of 2 to 1, 3 to 1, and 4 to 1, respectively. Samples of each composite sheet product having respective foam layer ratios of 2 to 1, 3 to 1, and 4 to 1 were tested for liquid absorption, retention, and surface tack by the identified test procedures, and the results are presented in Table II. Each of the samples exhibited the hand, drape, and physical appearance of natural chamois leather.

TABLE II

| Sample | Liquid Absorption Speed, Seconds | Total Liquid Absorption % Dry Wgt. of Product | Tack Rating | Foam Ratio |
|---|---|---|---|---|
| Example 1 (control) | | | | |
| 1 | 1 sec. | 406% | 1 | 4 to 1 |
| 2 | 2 sec. | 433% | 2 | 4 to 1 |
| Example II | | | | |
| 1 | 2-3 sec. | 405% | 5 | 4 to 1 |
| 2 | 2 sec. | 429% | 5 | 4 to 1 |
| Example III | | | | |
| 1 | 5 sec. | 347% | 5 | 2 to 1 |
| 2 | 2 sec. | 413% | 5 | 3 to 1 |
| 3 | 3 sec. | 459% | 5 | 4 to 1 |

From the recorded test data of Table II, it can be observed that the artificial chamois composite sheet material products which are discontinuously printed with the urethane resin (Examples II and III) exhibit no surface tack, whereas the unprinted control samples (Example I) have high surface tack and are unacceptable as commercial products. It can further be observed from the data that surface tack is eliminated by overprinting with the urethane polymer without appreciably or significantly affecting the liquid absorption speed or retention of liquid in the composite product.

That which is claimed is:

1. A composite sheet material having the visual appearance, feel and drape of natural chamois leather, and excellent liquid absorption and retention comprising, in combination, a reinforcing textile fabric having opposed raised fiber surfaces, a soft water-absorbent porous polymeric acrylonitrile foam layer secured to each of the raised fiber faces of the textile fabric with the surface fibers of the fabric at least partially embedded therein, and wherein small discontinuous generally uniformly dispersed areas of the exposed porous surfaces of said foam layers are coated with a non-tacky, water-insoluble, film-forming polymer, said sheet material being characterized by no noticeable surface tack and an ability to absorb and retain liquid therein in an amount of at least about 300 percent of its dry weight.

2. A composite sheet material as defined in claim 1 wherein said film-forming polymer has a 100% modulus of from about 200 to 5,000 psi, a tensile strength of from about 2,000 to 12,000 psi, and an elongation break of from about 110 to 800%.

3. A composite sheet material as defined in claim 1 wherein the water-insoluble, film-forming polymer is a urethane polymer and is present on the sheet material in an amount of between about 0.05 and 0.25 oz. per sq. yd. of surface area of each of the foam layers.

4. A composite sheet material as defined in claim 3 wherein present in said film-forming urethane polymer coating is a slip agent selected from one or more of the groups consisting of silicones, waxes, and colloidal silica.

5. A composite sheet material as defined in claim 4 wherein said slip agent is a silicone and is present in an amount of about 0.3% by weight of the urethane polymer.

6. A composite sheet material as defined in claim 3 wherein said foam layers comprise a butadiene-acrylonitrile copolymer and an inert hydrophilic filler present in the amount of about 5 parts solids copolymer to 2 parts solids filler, by weight.

7. A composite sheet material as defined in claim 6 wherein said hydrophilic filler is clay, and the foam layers are foamed to a foam ratio of about 4 to 1.

8. A composite sheet material as defined in claim 6 wherein said sheet material has a liquid absorption and retention of at least about 400 percent by weight based on the dry weight of the material.

9. A composite sheet material as defined in claim 1 wherein said raised fibers on the opposed faces of the fabric are about 10 mils or greater in length.

10. A composite sheet material product as defined in claim 1 wherein said fabric is a woven cotton fabric.

11. A composite sheet material as defined in claim 1 wherein said fabric is a woven cotton/polyester blend fabric.

12. A composite sheet material as defined in claim 1 wherein the foam layers of the material each have a thickness of approximately 10 to 15 mils.

13. A method of producing a composite sheet material having the appearance, hand, and drape of natural chamois leather, improved water absorption and abrasion resistance, and reduced surface tack comprising the steps of:
(a) providing a textile fabric having opposed raised fiber faces,
(b) applying to each of the raised fiber faces of the fabric a layer of a water-absorbent polymeric foam latex composition to at least partially embed the raised fibers therein, and curing the composition to bond the layers to the fabric surfaces, and
(c) applying a non-tacky, water-insoluble, film-forming polymeric resin to small, closely spaced discrete areas of the exposed surfaces of the foam layers to form a discontinuous coating thereon, said resin being applied in an amount of between about 0.05 to 0.25 oz. per sq. yd. of exposed surface area of each of the foam layers.

14. A method as defined in claim 13 wherein said foam latex composition comprises a butadiene-acrylonitrile copolymer, a clay filler, a foam stabilizer, a cross-linking agent for the copolymer, and a pigment.

15. A method as defined in claim 14 wherein the copolymer is present in said latex composition in a ratio of about 5 parts solids copolymer to 2 parts solids filler.

16. A method as defined in claim 13 wherein said polymeric foam latex composition is applied to the raised fiber surfaces of the fabric sheet in a foam ratio of from about 2 to 1 to 6 to 1.

17. A method as defined in claim 13 wherein the foam latex composition is applied in a foam ratio of about 4 to 1.

18. A method as defined in claim 13 wherein said polymeric resin is a urethane polymer and is applied to the discrete areas of the exposed surfaces of the foam layers by printing the surface areas with the urethane polymer.

19. A method as defined in claim 18 wherein said polymeric urethane applied to the surfaces of the foam layers is a solvent-based aliphatic urethane polymer having a viscosity of approximately 180 centipoise, and is applied by generally uniformly printing the exposed surface areas of the foam layers.

20. A method as defined in claim 18 wherein said urethane polymer coating includes a slip agent selected from the one or more of the group consisting of silicones, colloidal silica, and waxes.

21. A method of manufacturing a composite sheet material product having the visual appearance, hand and drape of natural chamois leather, and having excellent water absorption and retention, comprising the steps of applying a soft polymeric porous foam layer to opposed raised fibrous faces of a textile reinforcing fabric, curing the foamed layers to bond the same to the fabric and provide a porous water absorbent sheet material product having exposed foam layer surfaces exhibiting high surface tack, and applying a non-tacky water-insoluble film-forming resin to small discontinuous surface areas of the exposed surfaces of the foam layers to coat the same and thereby eliminate surface tack and blocking of the surfaces without significantly reducing the water absorption and retention properties of the composite sheet product and its visual appearance, hand and drape.

* * * * *

UNITED STATES PATENT AND TRADEMARK OFFICE
CERTIFICATE OF CORRECTION

PATENT NO. : 4,341,832
DATED : July 27, 1982
INVENTOR(S) : Gary A. Barnett, James P. Shealy, Jr.

It is certified that error appears in the above-identified patent and that said Letters Patent are hereby corrected as shown below:

Column 2, line 3, "broadly" should read --boardy--.

Signed and Sealed this

Twenty-first Day of September 1982

[SEAL]

Attest:

Attesting Officer

GERALD J. MOSSINGHOFF

Commissioner of Patents and Trademarks